(12) United States Patent
Croxford et al.

(10) Patent No.: US 10,063,870 B2
(45) Date of Patent: Aug. 28, 2018

(54) METHOD OF AND APPARATUS FOR GENERATING AN ENCODED FRAME

(71) Applicant: ARM LIMITED, Cambridge, Cambridgeshire (GB)

(72) Inventors: Daren Croxford, Cambridge (GB); Tom Cooksey, Cambridge (GB); David Mansell, Cambridge (GB)

(73) Assignee: ARM Limited, Cambridge (GB)

( * ) Notice: Subject to any disclaimer, the term of this patent is extended or adjusted under 35 U.S.C. 154(b) by 129 days.

(21) Appl. No.: 15/304,301

(22) PCT Filed: Apr. 10, 2015

(86) PCT No.: PCT/GB2015/051105
§ 371 (c)(1),
(2) Date: Oct. 14, 2016

(87) PCT Pub. No.: WO2015/159053
PCT Pub. Date: Oct. 22, 2015

(65) Prior Publication Data
US 2017/0048534 A1 Feb. 16, 2017

(30) Foreign Application Priority Data

Apr. 15, 2014 (GB) .................................. 1406795.3

(51) Int. Cl.
*H04N 19/40* (2014.01)
*H04N 19/172* (2014.01)
(Continued)

(52) U.S. Cl.
CPC ........... *H04N 19/40* (2014.11); *H04N 19/172* (2014.11); *H04N 19/176* (2014.11); *H04W 84/12* (2013.01)

(58) Field of Classification Search
CPC .... H04N 19/40; H04N 19/172; H04N 19/176; H04W 84/12
See application file for complete search history.

(56) References Cited

U.S. PATENT DOCUMENTS

2003/0112161 A1  6/2003 Malik
2007/0047659 A1  3/2007 Aleksic
(Continued)

OTHER PUBLICATIONS

International Preliminary Report on Patentability dated Oct. 27, 2016 in PCT/GB2015/051105, 10 pages.
(Continued)

*Primary Examiner* — Joseph Suh
(74) *Attorney, Agent, or Firm* — Nixon & Vanderhye P.C.

(57) ABSTRACT

The technology described herein relates to a method of generating an encoded output video frame for transmission to an electronic display in which an encoded source video frame is decoded to obtain a decoded source video frame 200*a*, the decoded source video frame 200*a* is processed to obtain an input video frame 200*c*, and the input video frame 200*c* is encoded to obtain an encoded output video frame for transmission. The method comprises comparing a region of an input video frame 200*c* with a region of a decoded source video frame 200*a* from which decoded source video frame the input video frame has been obtained, to determine if the region of the decoded source video frame 200*a* is similar to the region of the input video frame 200*c*, and if it is determined that the region of the decoded source video frame 200*a* is similar to the region of the input video frame 200*c*, using a region of the encoded source video frame that corresponds to the region of the decoded source video frame as a region of the encoded output video frame for transmission that corresponds to the region of the input video frame.

20 Claims, 9 Drawing Sheets

(51) Int. Cl.
*H04N 19/176* (2014.01)
*H04W 84/12* (2009.01)

(56) References Cited

U.S. PATENT DOCUMENTS

| | | | | |
|---|---|---|---|---|
| 2007/0132784 A1* | 6/2007 | Easwar | ................. | H04N 19/48 345/629 |
| 2009/0190671 A1* | 7/2009 | Otsuka | ................. | H04N 19/176 375/240.27 |
| 2010/0027663 A1* | 2/2010 | Dai | ..................... | H04N 19/159 375/240.16 |
| 2010/0266045 A1* | 10/2010 | Katzur | ................. | H04N 19/176 375/240.16 |
| 2011/0090960 A1* | 4/2011 | Leontaris | ............ | H04N 19/103 375/240.12 |
| 2012/0328028 A1* | 12/2012 | Sadafale | ............. | H04N 19/159 375/240.24 |
| 2015/0092855 A1* | 4/2015 | Chou | .................. | H04N 19/105 375/240.16 |
| 2017/0013279 A1* | 1/2017 | Puri | ..................... | H04N 19/176 |
| 2017/0359589 A1* | 12/2017 | Stolt | ...................... | H04N 19/30 |

OTHER PUBLICATIONS

UK Search Report dated Oct. 21, 2014 in GB 1406795.3, 3 pages.
"PowerVR video IP solutions for wireless displays" Imagination Tecohnologies, Mar. 6, 2013, retrieved from http://withimagination.imgtec.com/index.php/powervr-video/powervr-video-solutions-for-wireless-displays, 5 pages.
NVIDIA® Miracast Wireless Display Architecture, NVIDIA Whitepaper, Jul. 24, 2012, pp. 1-8.
H. Kalva et al, "Performance Optimization of an MPEG-2 to MPEG-4 Video Transcoder" *Proc. SPIE Conf on VLSI Circuits and Systems*, May 2003, 12 pages.
J. Youn et al, "Motion Estimation for High Performance Transcoding" *IEEE Transactions on Consumer Electronics*, 44(3), Sep. 1998, manuscript received Jun. 17, 1998, pp. 649-658.
International Search Report for PCT/GB2015/051105, dated Jul. 15, 2015, 2 pages.

* cited by examiner

METHOD OF AND APPARATUS FOR GENERATING AN ENCODED FRAME

This application is the U.S. national phase of International Application No. PCT/GB2015/051105 filed 10 Apr. 2015, which designated the U.S. and claims priority to GB Patent Application No. 1406795.3 filed 15 Apr. 2014, the entire contents of each of which are hereby incorporated by reference.

BACKGROUND

The technology described herein relates to a method and an apparatus for generating an encoded output frame. In particular, the technology described herein relates to a method of and an apparatus for generating from a source video frame an encoded output frame to be transmitted to an electronic display for displaying.

As the processing power and speed of portable electronic devices increases, the ability for these devices to handle multimedia correspondingly increases. It has become possible to "stream" multimedia content wirelessly from portable electronic devices to electronic displays, and demand for this is growing. Here, portable electronic devices may for example include mobile telephones (e.g. smart phones), tablet and laptop computers. To "stream" refers to a method of delivering media content in which the content is being received by and simultaneously being displayed on an electronic display continuously while being transmitted from a source such as a portable electronic device.

In such arrangements, source material, such as source video content and/or source graphics content, will typically be processed within a portable electronic device before wireless transmission to the display (e.g. screen). For example, a source video frame may be decoded by a video decoder to obtain a decoded source video frame. The decoded source video frame may then be processed and may furthermore be composited with other content such as a graphics frame to obtain an input video frame, which is to be encoded by a video encoder to obtain an output video frame for transmission to an electronic display.

Conventionally, wireless display protocols specify that the source material is to be converted to a compatible colour space format before being encoded according to a suitable compression standard (e.g. MPEG H 264), and to a predetermined resolution amongst a range of supported resolutions (e.g. from 640×480 up to 1920×1200). The encoded data is packetized and then transmitted wirelessly, for example, over a Wi-Fi ad-hoc network. Common chrominance formats include decimated YUV format (e.g. YUV 4:2:0 format) for video sources and RGB format for graphics and composition sources.

Such processing of source content into encoded data for wireless transmission to a display can require substantial computation resources and bandwidth.

BRIEF DESCRIPTION OF THE DRAWINGS

Embodiments will now be described, by way of example only, with reference to the accompanying drawings, in which.

Like reference numerals are used for like features throughout the drawings, where appropriate.

DETAILED DESCRIPTION

Figure 1:
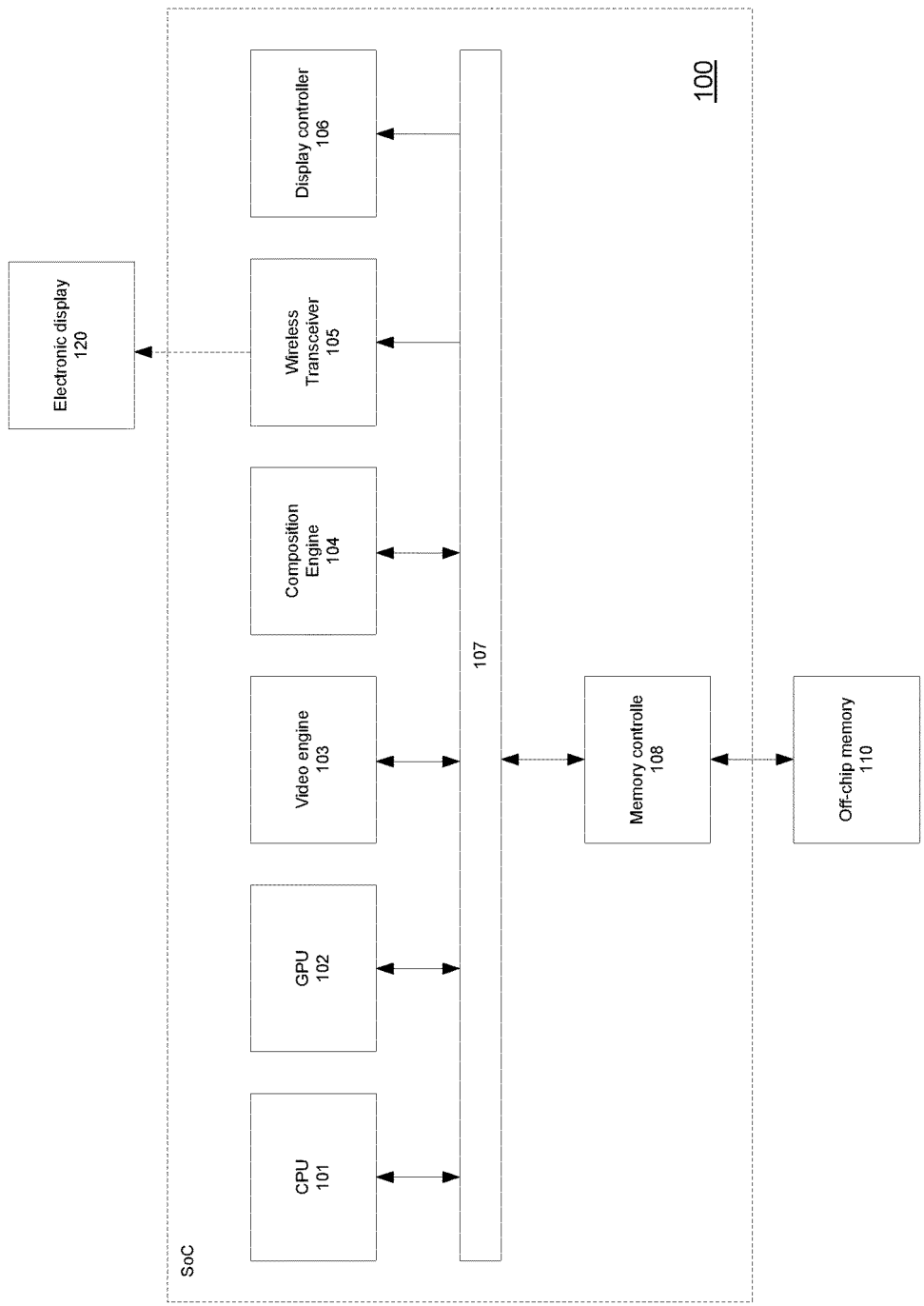
FIG. 1 is a schematic diagram of an exemplary data processing system for implementing a method according to an embodiment.

An embodiment comprises a method for generating an encoded output video frame for transmission to an electronic display in which an encoded source video frame is decoded to obtain a decoded source video frame, the decoded source video frame is processed to obtain an input video frame, and the input video frame is encoded to obtain an encoded output video frame for transmission. The method comprises comparing a region of an input video frame with a region of a decoded source video frame from which decoded source video frame the input video frame has been obtained, to determine if the region of the decoded source video frame is similar to the region of the input video frame, and if it is determined that the region of the decoded source video frame is similar to the region of the input video frame, using a region of the encoded source video frame that corresponds to the region of the decoded source video frame as a region of the encoded output video frame for transmission that corresponds to the region of the input video frame.

Another embodiment comprises a system for generating an encoded output video frame for transmission to an electronic display. The system comprises a video decoder configured to decode an encoded source video frame to obtain a decoded source video frame; a processing engine configured to process the decoded source video frame to obtain an input video frame; and a video encoder configured to encode the input video frame to obtain an encoded output video frame for transmission. The system further comprises processing circuitry configured to compare a region of an input video frame that has been obtained from a decoded source video frame with a region of the decoded source video frame to determine if the region of the decoded source video frame is similar to the region of the input video frame, and to, if it is determined that the region of the decoded source video frame is similar to the region of the input video frame, use a region of the encoded source video frame that corresponds to the region of the decoded source video frame as a region of the encoded output video frame for transmission that corresponds to the region of the input video frame.

The technology described herein relates to systems in which, e.g., a portable electronic device may obtain source video content from an external source (e.g. off-chip memory), and then process the source video content for transmission, e.g. wirelessly, to an electronic display, which may for example be a remote and/or wireless display. The source video content may be video content formed of a plurality of video frames that are encoded (compressed) using a predetermined encoding scheme. Each source encoded video frame is first decoded (decompressed), e.g. by a video engine (video decoder). The decoded source video frame may then be processed, e.g. by a composition engine, to (optionally) modify the decoded source video frame, for example by compositing the decoded video frame with additional data such as a graphics frame received from a graphics processing unit (GPU), to provide an input video frame for encoding, e.g. by a video encoder, for provision (transmission) to the display.

In the technology described herein, a frame region of the input video frame that is to be encoded for transmission to the display is compared with a frame region of the decoded source video frame (e.g. output by the video decoder) from which the input video frame is being generated. If it is determined that the frame region of the decoded source video frame is similar to the frame region of the input video frame, the frame region of the encoded source video frame (which is the original source video content before it is decoded) that corresponds to the frame region of the decoded source video frame is used for the frame region of the encoded output video frame for transmission to the electronic display that corresponds to the frame region of the input video frame. This can then avoid, e.g., and as will be discussed further below, the need to encode the corresponding region of the input video frame for transmission to the electronic display (as the original encoded source video frame region may be used instead).

The Applicants have recognised in this regard that in systems where source video content is decoded, processed, and then re-encoded for transmission for display, it can be the case that some or all of a given video frame may not be changed by its processing. For example, in some cases, it is possible that only a part or some parts, but not all, of a decoded source video frame will be modified by a compositing process (the composition engine). For example, if the decoded source video frame is composited with a graphics frame to add a line of subtitles to the image, then only a small portion at the bottom of the decoded source video frame will be modified while the rest of the decoded source video frame will be unmodified.

The Applicants have further recognised that for those parts of the decoded source video frame that are not modified, e.g., by the composition process, then it would be possible to reuse the encoded version of those parts of the video frame from the original encoded source video frame, thereby avoiding the need to "re-encode" those parts of the decoded and processed source video frame. This then reduces the processing that is required for generating the encoded output video frame for transmission to the display, and, e.g., also allows the original source video frame encoding to be used for the output video frame region in question (which original encoding may be more efficient and so thereby provide further savings in, e.g., bandwidth and resources).

The embodiments facilitate this by determining whether an input video frame region to be encoded for transmission is similar to the decoded version of an encoded source frame region. This similarity test effectively determines whether the source frame region has been modified by the processing to form the input video frame region that is to be encoded for transmission or not. If the input video frame region to be encoded is determined to be similar to the decoded source frame region, then it can be concluded that the source frame region has not been modified by the processing that is being carried out on the source video frame, and so, accordingly, the encoded version of the source video frame region can be used directly as the encoded version of that video frame region that is transmitted to the display for display.

The regions of the video frames that are considered in the embodiments can be any suitable and desired regions of the video frames. In an embodiment, each frame region represents a different part (region) of the frame in question. Each region should ideally represent an appropriate portion (area) of the frame, such as a plurality of data positions within the frame. Suitable region sizes could be, e.g., 8×8, 16×16, 32×32 data positions in the video frame. The frame regions may be regularly sized and shaped, e.g. in the form of rectangles (including squares). However, this is not essential and other arrangements could be used if desired.

Where each video frame is already sub-divided into regions for the purpose of the video encoding and processing (e.g. is divided into "macroblocks"), then in an embodiment, each region of the video frame that is considered in the manner of the technology described herein corresponds to a region that the video frame or frames is divided into for encoding and processing purposes.

Thus, in an embodiment, each region of the video frame that is considered in the manner of the technology described herein corresponds to one or more macroblocks of the frame. In an embodiment, each region that is considered corresponds to a given macroblock (i.e. the regions are the macroblocks that the video frames are divided into for processing purposes), although other arrangements, such as each region comprising a plurality of macroblocks or a part of a macroblock, would be possible if desired.

In an embodiment, each frame is processed as multiple frame regions, and the input video frame is compared with the decoded source video frame on a region by region basis. In this case, the comparison may be performed for each region that the input video frame is divided into, or it may be performed for some but not all of the regions that the input video frame is divided into.

The comparison may be performed for one or more regions of one video frame with respect to one or more regions of the other video frame. Thus, in an embodiment, the video frames are processed as a plurality of frame regions, and the step of comparing comprises comparing a frame region of the input video frame with one, or with more than one, of a plurality of frame regions of the decoded source video frame.

In an embodiment, each region that is compared is compared to its corresponding region (i.e. having the same position) in the other video frame. In other embodiments, the comparison is performed with respect to one or more other regions as well as (or instead of) the corresponding region of the other video frame. In this case, a region of the input video frame may accordingly be compared with a region or regions of the decoded source video frame that have different positions within the frame to the region of the input video frame in question.

The Applicants have recognised in this regard, that in some video frames there may be areas of the frame in which two or more frame regions are substantially the same or very similar (for instance an area depicting the sky). In this case, it may then be possible to reuse an encoded source video frame region for a different portion of the frame but which depicts the same image as the input video frame region being considered for the encoded version of the input video frame region in question that is transmitted to the display. Comparing the input video frame region with decoded source video frame regions that have different positions within the frame to the region of the input video frame in question allows this to be done.

Thus, in an embodiment, the frame region of the input video frame is compared with a frame region of the decoded source video frame having a different position within the video frame to the input video frame region, and if it is determined that the input video frame region is similar to the decoded source video frame region, the encoded version of the source video frame region is used for the input video frame region in the encoded output video frame.

It would also be possible to consider a complete video frame as one single frame region (i.e. to perform the operation of the technology described herein for the frames as a whole), if desired.

The comparison between frame regions (e.g. between a frame region of an input video frame and a frame region of a decoded source video frame) may be done in any suitable and desired manner. For example, some or all of the content of a frame region in the decoded source video frame may be compared with some or all of the content of a frame region of the input video frame.

In some embodiments, the comparison is performed by comparing information representative of and/or characteristic of the content of the frame regions (thus by comparing information representative of and/or characteristic of the content of a frame region of the decoded source video frame with information representative of and/or characteristic of the content of a frame region of the input video frame to be encoded, for example), to assess the similarity or otherwise between the respective frame regions of the video frames.

The information representative of the content of a region of a frame may take any suitable form, and moreover may be based on or derived from the content of the respective frame region. In some embodiments, it is in the form of a signature or signatures for the region which is or are generated from or based on the content of the frame region in question (e.g. the data block representing the region of the frame). Such a region content "signature" may comprise, for example, any suitable set of derived information that can be considered to be representative of the content of the region, such as a checksum, a CRC, or a hash value, etc., derived from (generated for) the data for the frame region in question. Suitable signatures would include standard CRCs, such as CRC64, or other forms of signature such as MD5, SHA 1, etc.

Thus, in some embodiments, a signature or signatures indicative or representative of, and/or that are derived from, the content of each frame region is generated for each frame region that is to be checked, and the comparing process comprises comparing a signature or signatures for a frame region of one video frame (e.g. the decoded source video frame) with a signature or signatures for a, e.g. corresponding, frame region of the other video frame (e.g. the input video frame) (e.g. to determine whether the signature(s) representing the frame region in question has or have changed (e.g. since the source video frame was decoded)).

Where signatures representative of the content of the frame regions are used, then it would, e.g., be possible to generate a single content-representing signature for each frame region. However, it would also be possible to subdivide each frame region that is to be compared into smaller sub-regions for the purposes of the signature generation process, and in an embodiment, this is what is done. In this case therefore each video frame region that is to be compared will have plural content-indicating signatures associated with it, one such signature for each sub-region that the video frame region has been divided into for the signature generation process. In this case the comparison of the signatures for respective video frame regions should then comprise comparing the respective signatures for the respective sub-regions of the video frame regions in question in an appropriate manner. In this case, the frame regions are only determined to be similar to each other if each respective pair of "signature" sub-regions is considered to be similar as a result of the comparison process.

This arrangement may be particularly appropriate where, for example, the video processing system operates on particular sub-regions of frames that do not correspond exactly to the macroblocks that are used for the purpose of encoding the video frames. This could be the case where, for example, the video processing, etc., is carried out in a tile-based fashion, for example using a tile-based video processor and/or graphics processing unit. In this case, it could be the case that each video frame macroblock will comprises plural tiles that the video and/or graphics processor operates on.

Thus in an embodiment the frame sub-regions that content-indicating signatures are generated for each corresponds to a tile that a graphics processor, video engine, display controller, composition engine, etc., that is generating the frame in question operates on and produces as its output. This may be a particularly straightforward way of generating the content-indicating signatures, as the, e.g. graphics processor, will generate the rendering tiles directly, and so there will be no need for any further processing to "produce" the frame sub-regions for which the signatures are generated.

In these arrangements of the technology described herein, the tiles that the frames are divided into can be any desired and suitable size or shape, and moreover may be of the form discussed above (thus e.g. rectangular (including square), and e.g. 8×8, 16×16 or 32×32 sampling positions in size).

In this case, the frame regions that are considered in the manner of the technology described herein may be, and in an embodiment are, made up of a set of plural "processing" tiles, but they may also, e.g., comprise only the sub-portion of a processing tile. In this latter case, the signature for the tile may still be used, e.g., for the purposes of comparing the frame region that the tile encompasses. Equally, it is not necessary for there to be an exact correspondence between the tiles that the signatures are generated for and the frame regions that are to be compared. In the case that there is not an exact correspondence, then signatures for all the tiles that the frame region at least in part covers may be compared to determine if the frame region has changed or not.

The signature generation, where used, may be implemented as desired. For example, it may be implemented in an integral part of the GPU, video engine (e.g. decoder), and/or the composition engine that is generating the frame, or there may for example be a separate "hardware element" dedicated for this function.

The signatures for the frame regions may be appropriately stored and associated with the regions of the frame to which they relate. In some embodiments, they may be stored with the frames in the appropriate buffers, for example with the frame buffer. Then, when the signatures are to be compared, the stored signature(s) for a region may be retrieved appropriately.

In some examples, the comparison process may require an exact match between the two frame regions for the two frame regions to be considered the same or sufficiently similar, but in other examples, only a sufficiently similar (but not exact) match, for example, that does not exceed a given threshold, may be required for the two regions to be considered sufficiently similar.

Thus, in some examples, the comparison process may require an exact match between two signatures (or between each respective pair of signatures, where plural signatures are being compared) for the two frame regions to be considered the same or sufficiently similar, but in other examples, only a sufficiently similar (but not exact) match, for example, that does not exceed a given threshold, may be required for the two regions to be considered sufficiently similar.

Where signatures indicative of the content of the frame regions are compared, depending upon the nature of the signatures involved, a threshold could be used for the signature comparison processes to ensure that any small changes in the frame regions (in the frame region's signature) are ignored (do not trigger a determination that the frame region is not similar (has changed)), if desired. Additionally, or alternatively, the signature generation process could be configured so as to generate signatures that effectively ignore (are not changed by) only small changes in the frame regions (for example by basing the signatures on some but not all of (e.g. a selection of the most significant bits of) the data values for the frame regions in question.

As is known in the art, video frames may be encoded (compressed) using different algorithms to different frame types, the three main frame types being I (intra-coded), P (predictive) and B (bidirectional predictive). An I-frame is a fully self-contained frame (i.e. does not require information from another frame in the video sequence in order to be decoded). A P-frame holds changes in the image from the preceding frame, and therefore requires information of the preceding frame to be decoded. A B-frame is encoded based on differences with respect to a preceding frame and a subsequent frame, and therefore requires information of both the preceding and the subsequent frame to be decoded. A video compression stream generally comprises all three frame types arranged in groups of predetermined order. For example, a typical group arrangement may be "IBBP".

The Applicants have recognised in this regard that where a frame that is fully self-contained (e.g. an I-frame) is being processed, then it will be sufficient to simply compare regions in the two versions of the video frame in question. However, in the case of frames, such as B-frames and P-frames, that are dependent upon other frames in the sequence of video frames, then it may be necessary to also compare the respective regions in those other video frames in the sequence of video frames to determine if the frame regions can be considered to be similar or not.

Thus, in an embodiment, where the video frame being considered is dependent upon another video frame in the sequence of video frames, then as well as comparing a region of the input video frame in question with a region of the corresponding decoded source video frame, the corresponding regions of the input video frame and of the decoded source video frame for the other video frame or frames in the video frame sequence that the current video frame is dependent upon are also compared to determine if they are similar as well, and only if both the regions in the input video frame in question and the corresponding decoded source video frame are considered to be similar to each other and the corresponding regions of the input video frame and of the decoded source video frame for the other video frame or frames in the video sequence that the current frame is dependent upon are determined to be similar to each other, is determined that the region of the input video frame in question is similar to the region of the corresponding decoded source video frame such that the region of the encoded source video frame is then used as the region of the encoded output video frame (i.e. the region of the encoded source video frame in question is only used as the region of the encoded output video frame for transmission to the display if the regions that are being compared are determined to be (sufficiently) similar in the decoded source video frame and the input video frame to be encoded for transmission for each frame in the sequence of video frames that the current video frame is dependent upon).

In this case, while it would be possible to retain and compare the actual other video frames in the sequence of video frames (and this may be possible as typically data for a sequence of frames will be available at any one time), where the comparison is carried out using, for example, appropriate content-indicating signatures, then it may only be necessary to retain the relevant content-indicating signatures for the regions of the other video frames in the sequence for the purposes of the comparison, if desired (and in an embodiment that is what is done).

Thus, in an embodiment, when the first decoded source video frame is decoded based on one or more second decoded source video frames, before using the region of the first source video frame as the region of the first output video frame, for each of the one or more second decoded source video frames, a region of a second input video frame that corresponds to the region of the first input video frame, the second input video frame being obtained from the second decoded video frame, is compared with a region of the second decoded source video frame that corresponds to the region of the first decoded source video frame being considered, so as to confirm that the region of the second input video frame and the region of the second decoded source video frame are similar as well.

In an embodiment, the first decoded source video frame may be decoded based on a preceding decoded source video frame that precedes it in time (in the stream (sequence) of video frames. For example, the current decoded source video frame may be a P-frame that is decoded based on the information from a preceding decoded I-frame. In this example, when it is determined that a frame region of the current input video P-frame is similar to a frame region of the current decoded P-frame, an additional determination step is performed in which a frame region of the preceding input video I-frame, which corresponds to the frame region of the current input video frame, is compared with a frame region of the preceding decoded I-frame, which corresponds to the frame region of the current decoded P-frame, to confirm that the frame region of the preceding input video I-frame is also similar to the frame region of the preceding decoded I-frame. Upon confirming that the frame region of the preceding input video I-frame is also similar to the frame region of the preceding decoded I-frame, it is determined that the frame region of the original source P-frame before decoding, which corresponds to the frame region of the current decoded P-frame, can be reused as the encoded P-frame region of the current output video P-frame that corresponds to the frame region of the current input video P-frame.

In another embodiment, the first decoded source video frame may be decoded based on a subsequent decoded source video frame that is subsequent to it in time (in the sequence of video frames). For example, the current decoded source video frame may be a B-frame that is decoded based on the information from a preceding decoded P-frame and a subsequent decoded I-frame. In this example, when it is determined that a frame region of the current input video B-frame is similar to a frame region of the current decoded B-frame, an additional determination step is performed in which a frame region of the subsequent input video I-frame, which corresponds to the frame region of the current input video B-frame, is compared with a frame region of the subsequent decoded I-frame, which corresponds to the frame region of the current decoded B-frame, to confirm that the frame region of the subsequent input video I-frame is also similar to the frame region of the subsequent decoded I-frame. In this example, a further determination step may be performed in which a frame region of the preceding input video P-frame, which corresponds to the frame region of the current input video B-frame, is compared with a frame region of the preceding decoded P-frame, which corresponds to the frame region of the current decoded B-frame, to confirm that the frame region of the preceding input video P-frame is also similar to the frame region of the preceding decoded P-frame. Upon confirming that the frame region of the subsequent input video I-frame is also similar to the frame region of the subsequent decoded I-frame, and confirming that the frame region of the preceding input video P-frame is also similar to the frame region of the preceding decoded P-frame, it is determined that a frame region of the original source B-frame before decoding, which corresponds to the frame region of the current decoded B-frame, can be reused as the encoded B-frame region of the current output video B-frame that corresponds to the frame region of the current input video B-frame.

In other embodiments, when it is determined that the current input video frame is not an I-frame, the processing may be allowed to proceed to determine if the corresponding regions of the preceding input video frame and preceding decoded source video frame are also similar, when they are confirmed to be similar, the processing may then be allowed to proceed to further determine if the current input video frame is a P-frame, and if it is determined that the current input video frame is not a P-frame, the processing may optionally proceed to encode the whole current input video frame if desired, without proceeding to perform an additional determination step with respect to a subsequent frame. Alternatively, when it is determined that the current input video frame is not an I-frame, the processing may at this point optionally proceed to encode the whole current input video frame without performing any additional determination step with respect to either a preceding frame or a subsequent frame. These alternatives may be implemented in some embodiments if a simplified method is desired.

The encoded source video frame may be decoded to obtain the decoded source video frame in any suitable and desired manner, e.g. depending upon how the source video is encoded. This process may be performed by any suitable component of the overall data processing system, such as a suitable video engine or video decoder. There may, for example, be a separate video processor provided for this purpose, or another processor, such as a CPU or GPU of the system may perform this operation.

The processing of the source video frame to obtain the input video frame may similarly be carried out in any desired and suitable manner, and comprise any suitable and desired form of processing.

In an embodiment, this processing comprises combining additional data with the video content of the decoded source video frame. For example, subtitles and/or video playback control may be added to the video content, in which case text and/or graphics frames may need to be composited with the corresponding source video frame before being encoded for transmission to the electronic display. Thus the decoded source video frame may be processed by compositing it with one or more other source frames (and the input video frame may be a composited frame). In this case, the system may include an appropriate composition engine. Again, this may be provided as a "stand alone" composition engine, or a CPU or GPU of the system, for example, may perform the compositing process.

The data (e.g. source frames) that the decoded source video frame is composited with may be provided and generated as desired. In an embodiment the system includes a graphics processor (graphics processing unit) that generates appropriate frames for compositing with the decoded source video frame.

As discussed above, in the case that it is determined that the region of the decoded source video frame is similar to the region of the input video frame to be encoded, then the encoded (original encoded) version of the region of the source video frame is used for transmission to the display. This then avoids having to re-encode that region of the video frame for transmission to the display (and accordingly, in this case, the region of the input video frame need not be re-encoded).

The region of the original encoded source video frame can be provided as the output video frame region for transmission as desired. For example, it may be read from memory where it is stored and then provided to the display appropriately.

The above discusses the situation where it is determined that the region of the decoded source video frame is similar to a region of the input video frame to be encoded, such that a region of the encoded source video frame can be reused for transmission to the display.

However, the Applicants have also recognised that there will be situations where the region of the decoded source video frame is not similar to the region of the input video frame to be encoded. This may be the case, for example, where the source video frame has been composited with another frame for the transmission to the display, thereby changing the content of the source video frame region.

In this case, it is desired then not to reuse the encoded source video frame region for transmission to the display, but to instead encode the new, modified source video frame region (the input video frame region) for transmission to the display.

Thus, in an embodiment, if it is determined that a region of the input video frame is not similar to a region of the decoded source video frame, and/or that the region of another input video frame that the current input video frame depends upon is not similar to a region of the another decoded source video frame, the region of the input video frame is encoded for transmission to the electronic display.

In this case, the encoding of the input video frame region for transmission to the electronic display can comprise any desired and suitable form of encoding. In an embodiment the encoding is so as to place the input video frame region data in a format suitable for transmission (and e.g. wireless transmission) to the electronic display. It may also, for example, involve appropriate colour space conversion and/or compression of the input video frame region.

Although the technology described herein has been described above primarily with reference to processing a single video frame region, as will be appreciated by those skilled in the art, the technology described herein may be repeated for plural regions within a given video frame, and for each respective region that the video frame has been divided into.

Correspondingly, the technology described herein may be repeated for and used for each frame of a sequence of plural video frames (e.g. where a video is to be streamed to a display for display).

In this regard, while it would be possible to use the process of the technology described herein for each and every video frame to be processed, the Applicants have recognised that there may be circumstances where it may be undesirable or unnecessary to use the process of the technology described herein for a video frame. Thus, in an embodiment, the technology described herein is used for selected video frames only, e.g. only where the video frames to be processed meet certain, selected, predetermined, criteria.

For example, where the video encoder encodes input video frames using the same or a compatible encoding format as the source video frames, and the encoding format of the source video frames is supported by or compatible with the electronic display, then a frame region of the encoded source video frame that corresponds to the frame region of the decoded source video frame may be reused as an encoded frame region of the output video frame that corresponds to the frame region of the input video frame for transmission to the electronic display.

Moreover, in some embodiments, the frame ordering of the source video frames may be the same as the frame ordering used by the video encoder.

However, the input video frames can be encoded for transmission in an encoding format that is different from the encoding format of the source video frames and/or the frame ordering of the source video frames can be different from the frame ordering used by the video encoder. For example, the source video frames may have a group structure of e.g. "IBBP" while the encoded input video frames may be encoded and output with a group structure of e.g. "IBBPBBP", and/or the source video frames may be encoded using an entirely different encoding scheme (an encoding scheme that allows higher compression for example) compared to the encoding scheme used by the video encoder. Also, the encoding format of the source video frames may not be supported by or compatible with the electronic display. Under these circumstances, it may not be possible or desirable to use a frame region of the encoded source video frame as a frame region of the output video frame for transmission to the electronic display.

Thus, in an embodiment, the technology described herein further comprises, e.g. before determining whether a decoded source video frame has been modified (is similar or not), determining whether the encoding format of the source video frame is supported by or at least compatible with the electronic display and/or the video encoding process being used. If it is determined that the encoding format is not supported by or at least compatible with the electronic display, and/or the video encoding process being used, the input video frames (each input video frame region) may be encoded by the video encoder for transmission to the electronic display, irrespective of whether it is similar to a frame region of the decoded source video frame or not, and without comparing frame regions of the decoded source video frame with frame regions of the input video frame.

Similarly, in some embodiments, the source video and the encoded output video to be transmitted to the electronic display have the same resolution. In most cases, there may be no advantage in using different resolution for the encoded output video compared to the source video, as the resolution of the encoded output video is limited by the resolution of the source video—encoding the encoded output video in higher resolution than the source video would not increase the resulting resolution as no additional information exists. In this case again, it will be possible to use the encoded source video frame regions for transmission to the display.

However, there may be cases in which the resolution differs, for example if the electronic display only accepts a particular range of resolution that is different from the resolution of the source video. There may also be instances when it is desirable to reduce the resolution of the encoded output video, for example if the electronic display does not support higher resolution or to reduce processing time, etc. In examples where the resolution of the source video and the output video are different, it may not be possible to use the encoded source video frame regions for the output video frame that is transmitted to the display.

Thus, in an embodiment, the technology described herein further comprises determining whether the region of the source video frame and the region of the encoded output video frame will have the same resolution, and if it is determined that the resolution is different, the region of the input video frame is encoded for transmission to the electronic display, irrespective of whether it is similar to the frame region of the decoded source video frame or not, and without comparing frame regions of the decoded source video frame with frame regions of the input video frame.

The above discusses an arrangement in which it is determined whether the encoded source video frame can be reused for an encoded output video frame region that is to be transmitted for display. The Applicants have further recognised that a corresponding arrangement could be used to facilitate the reuse of previously encoded versions of an input video frame to be encoded, for example if it is determined that one region of an input video frame to be encoded is similar to a previously encoded region of the input video frame. This may be applied both to frame regions within the same, current input video frame that is to be encoded, and also to frame regions within previous input video frames that have been encoded (e.g. where the encoded versions of those frame regions are retained for later use).

Thus, in another embodiment, a first frame region of a plurality of frame regions of the input video frame is compared with one or more of a plurality of frame regions of the same and/or of one or more preceding input video frames, and if it is determined that the first frame region is similar to a frame region of the same input video frame or a frame region of a preceding input video frame, the encoded version of the frame region of the same input video frame or of the frame region of a preceding input video frame that was determined to be similar to the first frame region is used for the first frame region in the encoded output video frame.

Correspondingly, in an embodiment, a first frame region of the input video frame is compared with a second frame region of the input video frame having a position in the frame different from the first frame region, and if it is determined that the first frame region is similar to the second frame region, the encoded version of the second frame region is used for a frame region in the encoded output video frame that corresponds to the first frame region of the input video frame.

In an embodiment, this additional comparison is done if (and only if) it is determined that the decoded source video frame has been modified.

It is believed that such an arrangement that facilitates the potential reuse of previously encoded input video frame regions may be new and advantageous in its own right, and not just in the situation where comparisons are also being made between input video frame regions and decoded source video frame regions.

Thus, another embodiment comprises a method of generating an encoded output video frame for transmission to an electronic display, wherein an input video frame is encoded to obtain an output video frame for transmission to an electronic display, the method comprising:

comparing a region of an input video frame to be encoded for use in an output video frame with the unencoded version of a region of an input video frame that has previously been encoded for use in an output video frame to determine if the region of the input video frame is similar to the region of the input video frame that has previously been encoded; and if it is determined that the region of the input video frame to be encoded is similar to the region of the input video frame that has previously been encoded, using the encoded version of the region of an input video frame that has previously been encoded that corresponds to the region of the input video frame to be encoded as a region of the encoded output video frame for transmission that corresponds to the region of the input video frame to be encoded.

Similarly, another embodiment comprises a system for generating an encoded output video frame for transmission to an electronic display, comprising:

a video encoder that encodes an input video frame to obtain an output video frame for transmission to an electronic display; and further comprising processing circuitry configured to, when the system is generating an encoded output video frame for transmission to an electronic display from an input video frame:

compare a region of an input video frame to be encoded with the unencoded version of a region of an input video frame that has previously been encoded for use in an output frame to determine if the region of the input video frame is similar to the region of the input video frame that has previously been encoded; and if it is determined that the region of the input video frame to be encoded is similar to the region of the input video frame that has previously been encoded, use the encoded version of the region of an input video frame that has previously been encoded that corresponds to the region of the input video frame to be encoded as a region of the encoded output video frame for transmission that corresponds to the region of the input video frame to be encoded.

As will be appreciated by those skilled in the art, these embodiments of the technology described herein can and may do include any one or more or all of the optional features of the technology described herein, as appropriate. Thus, for example, the determination of whether the frame regions are the same may be performed in one of the manners discussed above.

In an embodiment of these embodiments of the technology described herein, the regions of the video frames that are compared are tiles that the relevant processing elements operate on (and, e.g., produce as their output), although other arrangements would, of course, be possible. Also, in an embodiment, the comparison of the input video frame region to be encoded is with an unencoded version of the previous (the immediately preceding) input video frame region that has been encoded (e.g. the previous tile), although again, as discussed above, in other embodiments the comparison may be with other regions of an input video frame (and regions in other input video frames in the sequence of frames), not just with the previous input video frame region.

The encoder may also, if desired, and as discussed above, check how the respective video frame regions are to be encoded to see if a previously encoded video frame region can in fact be reused for the current video frame region to be encoded.

The technology described herein may be implemented in any desired and suitable data processing system that is operable to generate frames to be transmitted to an electronic display for display.

The data processing system that the technology described herein is implemented in may contain any desired, appropriate and suitable elements and components. Thus it may contain one or more or all of: a CPU, a GPU, a video processor (video engine/encoder-decoder), a display controller, a wireless transceiver, and appropriate memory for storing the various frames and other data that is required.

The comparison between a frame region of a decoded source video frame with a frame region of the same (or another) video frame may be performed by any suitable and desired component of the overall data processing system. For example, this could be performed by a CPU, GPU or separate processor (e.g. ASIC) provided in the system (in the system on-chip) or by the display controller for the display in question. The same element could perform all the processes, or the processes could be distributed across different elements of the system, as desired.

The encoded source video frame, decoded source video frame, graphics frame, composited frame, input video frame to be encoded, encoded output video frame and any other source or output frames, etc. may be stored in any suitable and desired manner in memory, e.g. in appropriate buffers. For example, the output frame may be stored in an output frame buffer. The output frame buffer may be an on chip buffer or it may be an external buffer. Similarly, the output frame buffer may be dedicated memory for this purpose or it may be part of a memory that is used for other data as well.

Similarly, the buffers that the input frames are first written to when they are generated (rendered) may comprise any suitable such buffers and may be configured in any suitable and desired manner in memory. For example, they may be an on chip buffer or buffers, or may be an external buffer or buffers. Similarly, they may be dedicated memory for this purpose or may be part of a memory that is used for other data as well. The input frame buffers may, for example, be in any format that an application requires, and may, for example, be stored in system memory (e.g. in a unified memory architecture), or in graphics memory (e.g. in a non-unified memory architecture).

The technology described herein may be extended to other type of source content, for example graphics content and audio content, and to other forms of encoded data (not just for transmission to a display, etc.).

Thus, another embodiment comprises a method of generating an encoded output set of data (e.g. a data array), in which an encoded source set of data (e.g. data array) is decoded to obtain a decoded source set of data (e.g. data array), the decoded source set of data (e.g. data array) is processed to obtain an input set of data (e.g. data array), and the input set of data (e.g. data array) is encoded to obtain an encoded output set of data (e.g. data array), the method comprising:

comparing a sub-set of data of an input set of data that has been obtained from a decoded source set of data with a sub-set of data of the decoded source set of data to determine if the sub-set of data of the decoded source set of data is similar to the sub-set of data of the input set of data; and if it is determined that the sub-set of data of the decoded source set of data is similar to the sub-set of data of the input set of data, using a sub-set of data of the encoded source set of data that corresponds to the sub-set of data of the decoded source set of data as a sub-set of data for the encoded output set of data that corresponds to the sub-set of data of the input set of data.

Another embodiment comprises a system for generating an encoded output set of data, comprising:

a decoder that decodes an encoded source set of data to obtain a decoded source set of data;

a processing engine that processes the decoded source set of data to obtain an input set of data; and an encoder that encodes the input set of data to obtain an output set of data; and further comprising processing circuitry configured to, when the system is generating an encoded output set of data from an encoded source set of data:

compare a sub-set of data of an input set of data that has been obtained from the decoded source set of data with a sub-set of data of the decoded source set of data to determine if the sub-set of data of the decoded source set of data is similar to the sub-set of data of the input set of data; and if it is determined that the sub-set of data of the decoded source set of data is similar to the sub-set of data of the input set of data, use a sub-set of data of the encoded source set of data that corresponds to the sub-set of data of the decoded source set of data as a sub-set of data of the encoded output set of data that corresponds to the sub-set of data of the input set of data.

As will be appreciated by those skilled in the art, these embodiments of the technology described herein can and may do include any one or more or all of the optional features of the technology described herein, as appropriate. For example, the determination of whether the sub-sets of data are the same may be performed in one of the manners discussed above.

The technology described herein may be implemented in any suitable system, such as a suitably configured microprocessor based system. In some embodiments, the technology described herein is implemented in a computer and/or micro-processor based system.

The various functions of the technology described herein may be carried out in any desired and suitable manner. For example, the functions of the technology described herein may be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

The technology described herein is applicable to any suitable form or configuration of graphics/video processor and renderer, such as processors having a "pipelined" rendering arrangement (in which case the renderer will be in the form of a rendering pipeline). It is particularly applicable to tile-based graphics processors, graphics processing systems, video processors, video processing systems, composition engines and compositing display controllers.

It will also be appreciated by those skilled in the art that all of the described embodiments of the technology described herein may include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising a code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An exemplary data processing system 100 is shown in FIG. 1, which is configured to implement a method for generating encoded output video frames for transmission to an electronic display of an embodiment.

The data processing system 100 comprises a central processing unit (CPU) 101, a graphics processing unit (GPU) 102, a video engine 103, a composition engine 104, a wireless transceiver (e.g. WiFi) 105 and a display controller 106 that communicate via an interconnect 107. The CPU, GPU, video engine, composition engine, wireless transmitter and display controller access off-chip memory 110 for storing data including video frames via a memory controller 108. The data processing system 100 communicates with an electronic display (e.g. wireless or remote electronic display) 120 via the display controller 106. It should be noted that the display 120 does not form part of the data processing system 100.

The data processing system 100 will receive source video frames that are to be transmitted to an electronic display to be displayed. Each source video frame is first decoded/decompressed by the video engine 103 under the control of the CPU 101. The decoded source video frame may then be processed by the CPU, and may furthermore be combined with other data. For example, the composition engine 104 may generate a composited frame for display by compositing the decoded source video frame with one or more other source frames or data such as a graphics frame generated by the GPU 102. The composited frame is then stored, via the memory controller 108, in a frame buffer in the off-chip memory 110.

The composited frame is then retrieved from the frame buffer in the off-chip memory 110, to be used as an input video frame that is to be encoded (compressed) by a video encoder to obtain an output video frame for transmission to the electronic display. In the present embodiment, the video encoder compares one or more regions of the composited frame (of the input video frame to the video encoder) with one or more regions of the decoded source video frame generated by the video engine 103 to determine whether a region of the composited frame is similar to a region of the decoded source video frame. In the present embodiment, the similarity determination is performed between corresponding regions of the two frames, and is such that the similarity determination will determine that a region of the decoded source video frame is not similar to the corresponding region of the composited frame if the region of the decoded source video frame has been modified by the composition process.

The video encoder then outputs an encoded output video frame region, based on the result of the similarity determination, to an output video frame in memory.

If the similarity determination determines that the two frame regions are similar to each other (thus the decoded source video frame has not been modified), the video encoder uses the encoded version of the source video frame region (which is the source video frame region before it was decoded by the video engine), as the encoded output video frame region, thus avoiding encoding the composited frame region itself. In this case, the video encoder accordingly stores the encoded source video frame region in the output video frame buffer for use for the output video frame.

On the other hand, if the similarity determination determines that the two frame regions are not similar to each other (thus the decoded source video frame has been modified in the region in question), the video encoder encodes the input video frame region (the composited frame region) appropriately, and then stores the encoded input video frame (composited frame) region in the output video frame buffer for use for the output video frame.

The display controller 106 then reads the encoded output video frame from the output video frame buffer and sends it to the electronic display 120 for display.

The video encoder may be implemented as desired, e.g. in the video engine 103, in the display controller 106, or as a separate hardware component. The output video frame buffer may similarly be provided as desired, e.g. as a local buffer and/or in the off-chip memory 110.

Figure 2:
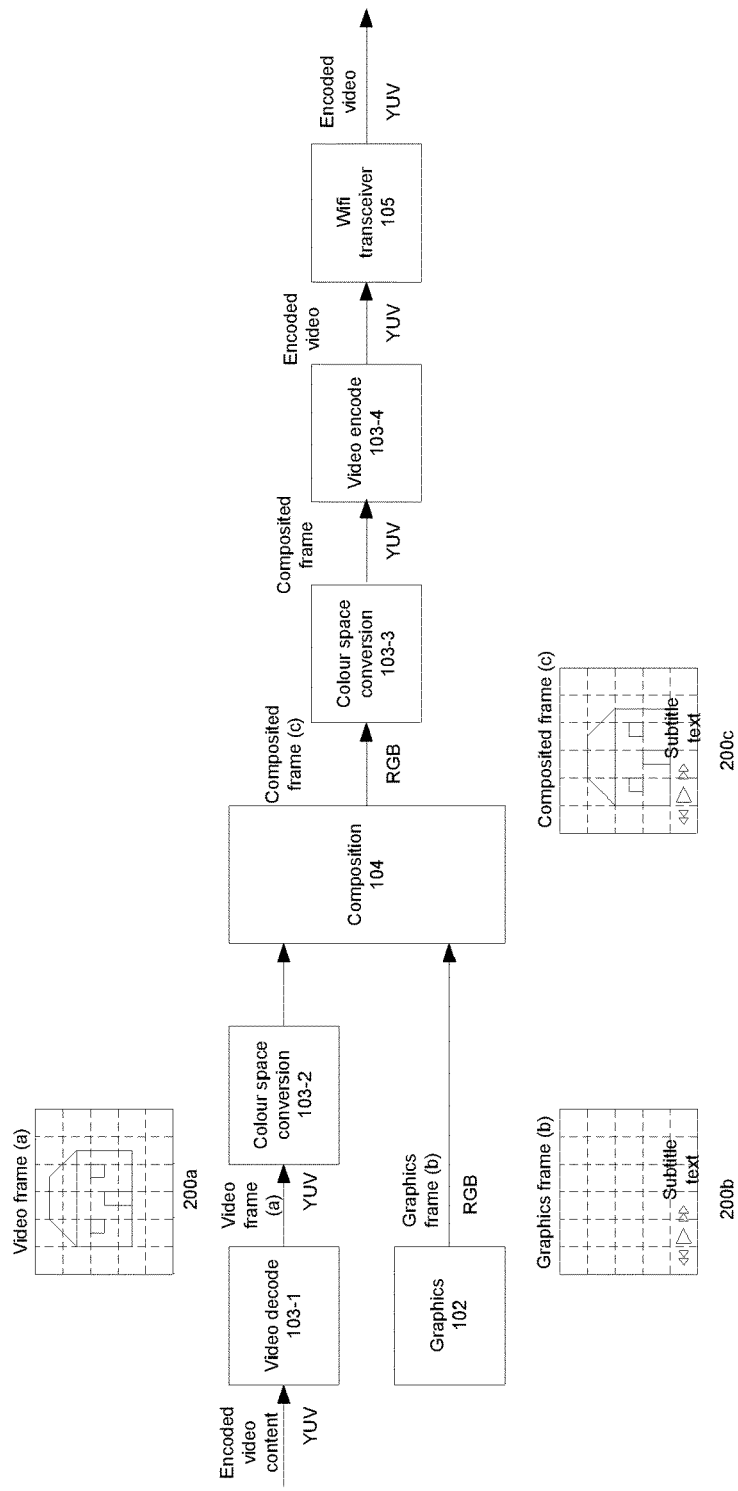
FIG. 2 is a schematic diagram showing an exemplary process of generating encoded video frames.

An example of the basic operation of the embodiments is shown schematically in FIG. 2, in which the GPU 102, video engine 103, composition engine 104, wireless transmitter 105 and display controller 106 are shown in a pipeline configuration for illustration purposes only.

In the example, encoded source video content in, for example YUV colour space, is input into the video engine 103 for decoding by video decoder 103-1. The decoded source video frame 200a undergoes a colour space conversion 103-2, for example by the video engine 103, and is converted to a format that is compatible with or the same as a graphics frame, for example RGB format. The decoded source video frame in RGB is then input into the composition engine 104. On the other hand, a graphics frame 200b is generated by GPU 102 in RGB colour space, which is also input into the composition engine 104. The graphics frame 200b may, for example, include playback controls for the video content and subtitles. The composition engine 104 composites the decoded source video frame 200a and the graphics frame 200b, and outputs a composited frame 200c.

For wireless transmission to an electronic display, the composited frame 200c first undergoes a colour space conversion 103-3, for example in the video engine 103, and is converted to, for example YUV format. A video encoder 103-4 may, for example, be implemented in the video engine 103. The video encoder 103-4 takes the composited video frame in YUV colour space 200c' (not shown) as an input video frame, and outputs an encoded output video frame to the wireless transmitter 105 for transmission to the electronic display.

The present embodiments differ from conventional operations in that the input video frame 200c' for encoding (the composited frame) is compared with the decoded source video frame 200a to determine if regions of the decoded source video frame 200a have been modified to obtain the input video frame 200c'. As can be seen in FIG. 2, provided that the video encoder 103-4 encodes an input video frame using the same encoding as the encoded source video content, if it is determined that a region of the input video frame 200c' is similar to a region of the decoded source video frame 200a, a region of the encoded source video content that corresponds to the region of the decoded source video frame 200a may be used as the encoded output video frame region for transmission to the electronic display.

Thus, when it is determined that a region of the input video frame 200c' is similar to a region of the decoded source video frame 200a, the encoded source video content is reused such that the video encoder 103-4 may avoid performing the encoding for the region of the input video frame 200c' in question.

(If the encoding scheme used by the video encoder 103-4 is not the same as the encoding scheme applied to the source video content, then even when it is determined that a region of the input video frame 200c' is similar to a region of the decoded source video frame 200a, it may not be possible or desirable to use the encoded source video content in the encoded output video frame for transmission to the electronic display. Thus, if desired, it may be first determined whether the encoding scheme used by the video encoder 103-4 is the same encoding scheme as is applied to the source video content.)

On the other hand, if it is determined that a region of the input video frame 200c' is not similar to a region of the decoded source video frame 200a (i.e. it is determined that the decoded source video frame 200a has been modified to obtain the input video frame region in question), then the video encoder 103-4 encodes the region of the input video frame 200c' in question for use as the output encoded version of that video frame region.

As shown in FIG. 2, the frames are divided into plural regions. The comparison between the input video frame 200c' and the decoded source video from 200a is performed on a region by region basis.

By performing the determination of whether a decoded source video frame has been modified or not to obtain the corresponding input video frame (the composited frame) to the video encoder on a frame region by frame region basis, it is possible to identify frame regions of the input video frame that are similar to frame regions of the decoded source video frame (i.e. that have not been modified) even when some areas of the decoded source video frame have been modified by being composited with another source frame, for example a graphics frame containing playback controls and subtitles.

In the present embodiments, the frame regions that are compared correspond to the macroblocks that are used for the video frame encoding. Other arrangements would, of course, be possible.

In the present embodiments, the determination of whether a frame region of a decoded source video frame is similar to an input video frame region (i.e. has been modified or not) is performed by comparing signatures representative of the content of the respective frame regions. In the embodiments, a signature is generated for each processing tile of the decoded source video frame that is representative of the content of the tile of the decoded source video frame, and a signature is generated for each processing tile of an input video frame that is representative of the content of the tile of the input video frame. The signatures of the tiles that correspond to the input video frame region being considered are then compared with the signatures of the tiles that correspond to the decoded source video frame region.

As in the present embodiments the frame regions that are being considered comprise video macroblocks, it may be (and typically will be) the case that each macroblock will comprise plural processing tiles. In this case, a frame region will have more than one content-indicating signature associated with it.

In this case, when frame regions are being compared, the relevant content-indicating signatures for each tile associated with the frame region in question may be respectively compared with each other, and only if each respective pair of tile signatures are the same, is it determined that the frame regions are similar (i.e. that the frame region has not been modified).

Figure 5:
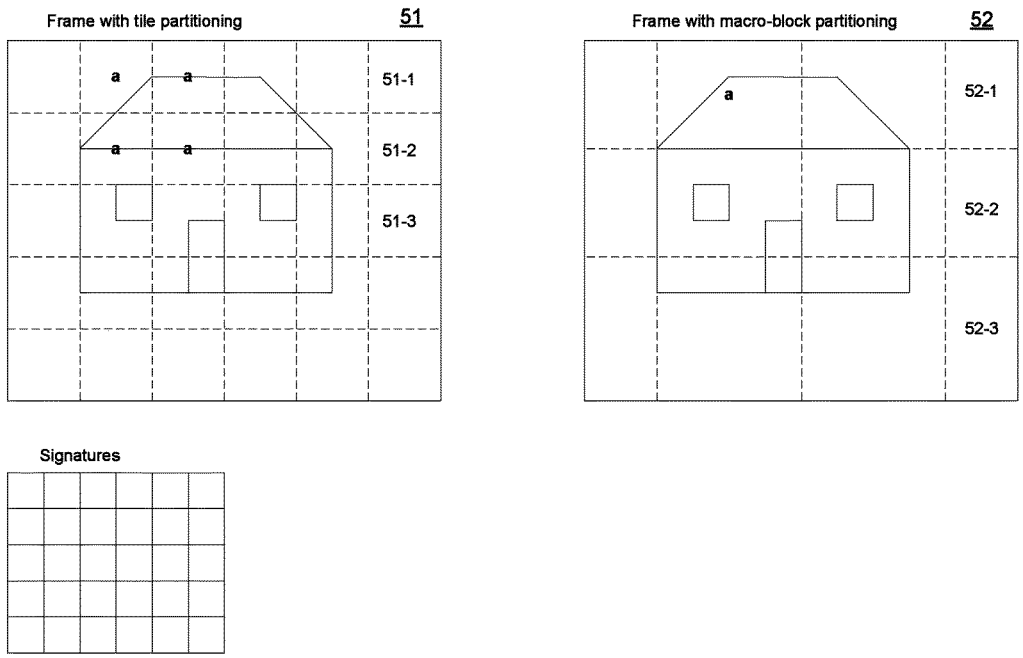
FIG. 5 is a schematic diagram showing examples of methods of partitioning a frame.

FIG. 5 illustrates this, and shows a frame 51 partitioned into a plurality of equally-sized processing tiles 51-1, 51-2, 51-3, etc., and the same frame 52 partitioned into a plurality of variable-sized macroblocks 52-1, 52-2, 52-3, etc. As shown in FIG. 5, in this case the four tiles labelled "a", for example, correspond to the macroblock labelled "a".

Other arrangements would, of course, be possible. For example, it may be the case that the video frame regions that are being considered correspond to the tiles (or other regions) that the signatures are being generated for, or, for example, a single signature could be generated for the respective video frame region as a whole, e.g. by appropriately combining the signatures of the individual tiles that the region covers.

To facilitate this operation, one or more content-indicating signatures are generated for each frame tile, and those content-indicating signatures, as well as any other data representing the frame regions themselves, are stored for use at a later stage. This data may be stored, for example, in the off-chip memory 110. Other arrangements would, of course, be possible, if desired.

In an example, the process of generating the frame tile content-indicating signatures may be performed by a signature generation hardware unit. The signature generation unit may be provided as an integral part of the CPU 101, the video engine 103 or the composition engine 104, as a separate hardware unit, or in any other suitable form, and operates to generate for each frame tile a signature representative of the content of the frame tile.

In the example, frame tile data is received by the signature generation unit, for example from the GPU 102, video engine 103, composition engine 104 or other processor that is generating graphics or video frames, and the data is passed to a buffer, which temporarily stores the frame tile data while the signature generation process takes place, and to a signature generator. The signature generator operates to generate the necessary signature for the frame tile. In an example, the signature may be in the form of a 64-bit CRC for the frame tile. Other signature generation functions and other forms of signature such as hash functions, etc., could also or instead be used, if desired.

A write controller may be associated with the signature generation unit, which, once the signature for a frame region has been generated, operates to store the signature in a per-frame tile signature buffer that is associated with the frame in the off-chip memory 110, under the control of the write controller. The corresponding frame tile data is also stored in an appropriate buffer in the off-chip memory 110.

In an embodiment, the content-indicating signatures for the frame tiles are generated using only a selected set of the most significant bits of the colours (MSB) in each frame tile (e.g. RGB[7:2]). These MSB signatures are then used to determine whether one frame tile is the same as or similar to another frame tile. The effect of basing the content-indicating signatures that are used to determine whether there is a difference between two frame tiles on the MSB of the frame tile data (colour) values only is that the two frame tiles may still be considered sufficiently similar even when there are minor differences between the frame tiles (e.g. differences in the least significant bits (LSB) only), such that input video frame regions will only need to be encoded separately by the video encoder when there is a more significant difference between the frame regions. This has the advantage of reducing the amount of encoding required for the video encoder to output an encoded video frame for transmission.

Other arrangements for reducing the amount of encoding required for the video encoder to output an encoded video frame could be used, if desired. For example, the comparison process may allow matches that are equal to or less than a predetermined threshold to still be considered to indicate that one frame region is sufficiently similar to another frame region, even if there have been some differences within the frame region.

Figure 6:
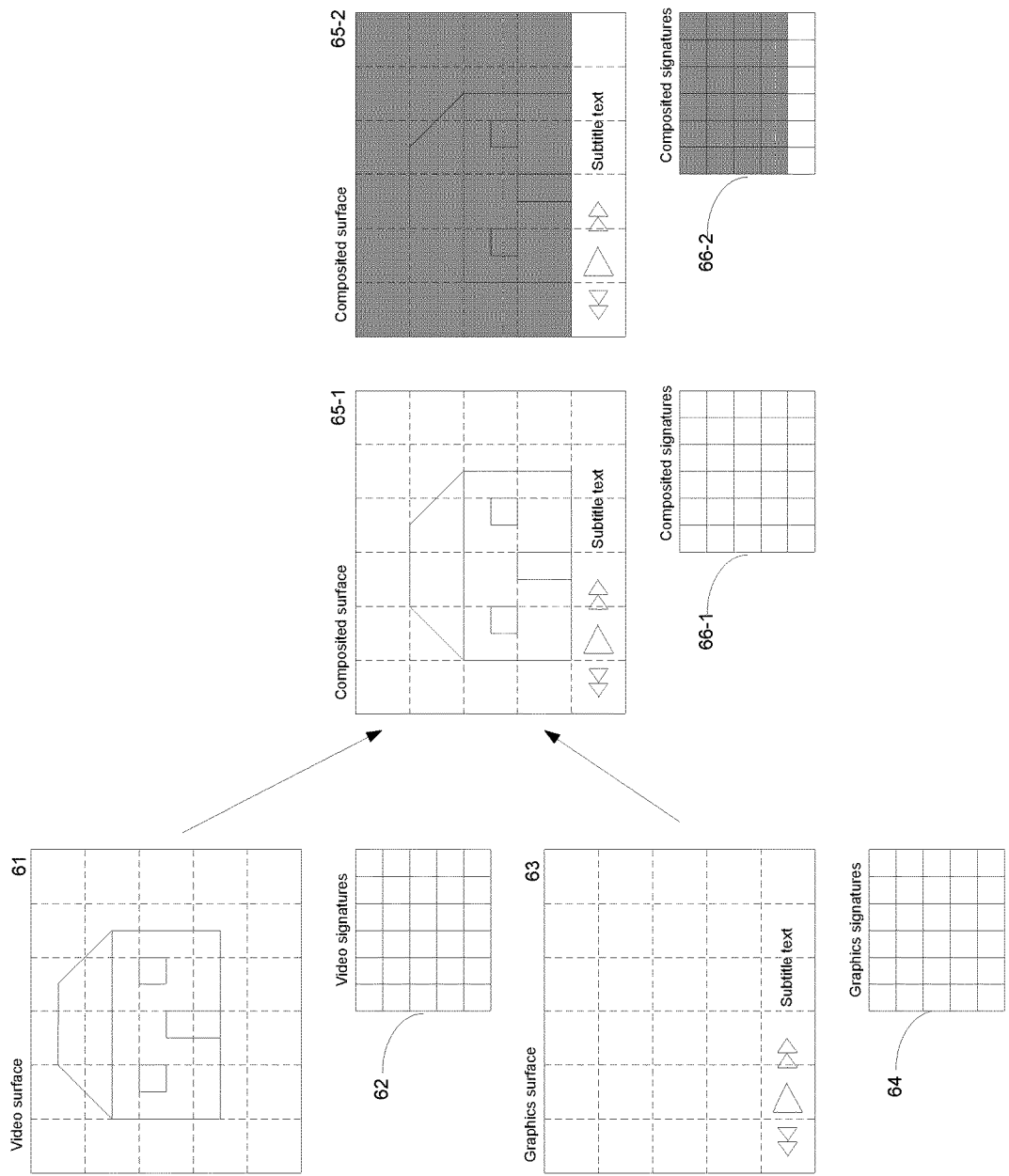
FIG. 6 is a schematic diagram illustrating an example of a comparison process based on frame regions.

FIG. 6 shows schematically the use of signatures to identify regions of a decoded video frame that have and that have not been modified by being composited with a graphics frame to form a composited input video frame to be encoded. For illustration purposes, it is assumed in FIG. 6 that a single content-indicating signature is provided for each relevant region of the frames in question, although as noted above, this need not be, and indeed may not be, the case.

As shown in FIG. 6, one or more signatures are generated for each region of a decoded source video frame 61 to obtain an array of video signatures 62 representing the content of the decoded source video frame 61. Similarly, one or more signatures are generated for each region of a source graphics frame 63 to obtain an array of graphics signatures 64 representing the content of the source graphics frame 63. Once the composition engine 104 has composited the decoded source video frame 61 with the source graphics frame 63 to obtain a composite frame 65-1, one or more signatures are generated for each region of the composited frame 65-1 to obtain an array of composited signatures 66-1 representing the content of the composited frame 65-1.

In the example of FIG. 6, as shown by the shading of the composited frame 65-2 (which content is the same as the composited frame 65-1, but shown with shading for illustration purposes), the shaded part of the composited frame 65-2 has not been modified by the composition engine 104, which may be identified by comparing the composited signatures 66-2 with the video signatures 62. In this example, the signature comparison would show that only the part of the composite frame 65-2 that is not shaded has been modified and therefore not similar to the corresponding part of the decoded source video frame 61. In this case, it is possible to minimise the amount of encoding, therefore processing, performed by the video encoder by reusing the encoded source frame regions that correspond to the shaded regions.

Figure 3:
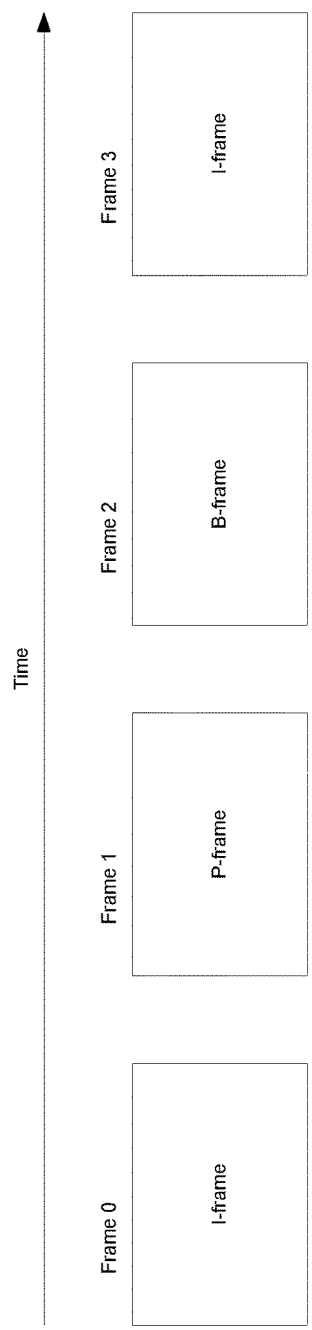
FIG. 3 is a schematic diagram showing an exemplary video frame grouping.

As is known in the art, the source video content may be formed of a plurality of encoded (compressed) video frames, arranged in groups of any order. An example of such grouping is shown in FIG. 3, in which the encoded video frames are arranged in groups each comprising and in the order of an I-frame, a P-frame, a B-frame and an I-frame.

In the present embodiments, the video encoder outputs encoded video frames in the same order as the source video content. Thus, when it is determined that a region of the input video frame 200c' is similar to a region of the decoded source video frame, the encoding of the source video content may be used as a region of the encoded output video frame that corresponds to the region of the input video frame for transmission to the electronic display.

(If the video encoder may output some or all of the encoded output video frames in an order that is not the same as the source video content, then for the some or all of the output video frames that are arranged in an order that is not the same as the source video content, even when it is determined that a region of the input video frame 200c' is similar to a region of a decoded source video frame, it may not be possible or desirable to use the original source video content for the encoded output video frame of the video encoder. Thus, if desired, it may be first determined whether the video encoder outputs some or all of the encoded video frames in an order that is the same as the source video content.)

Figure 4:
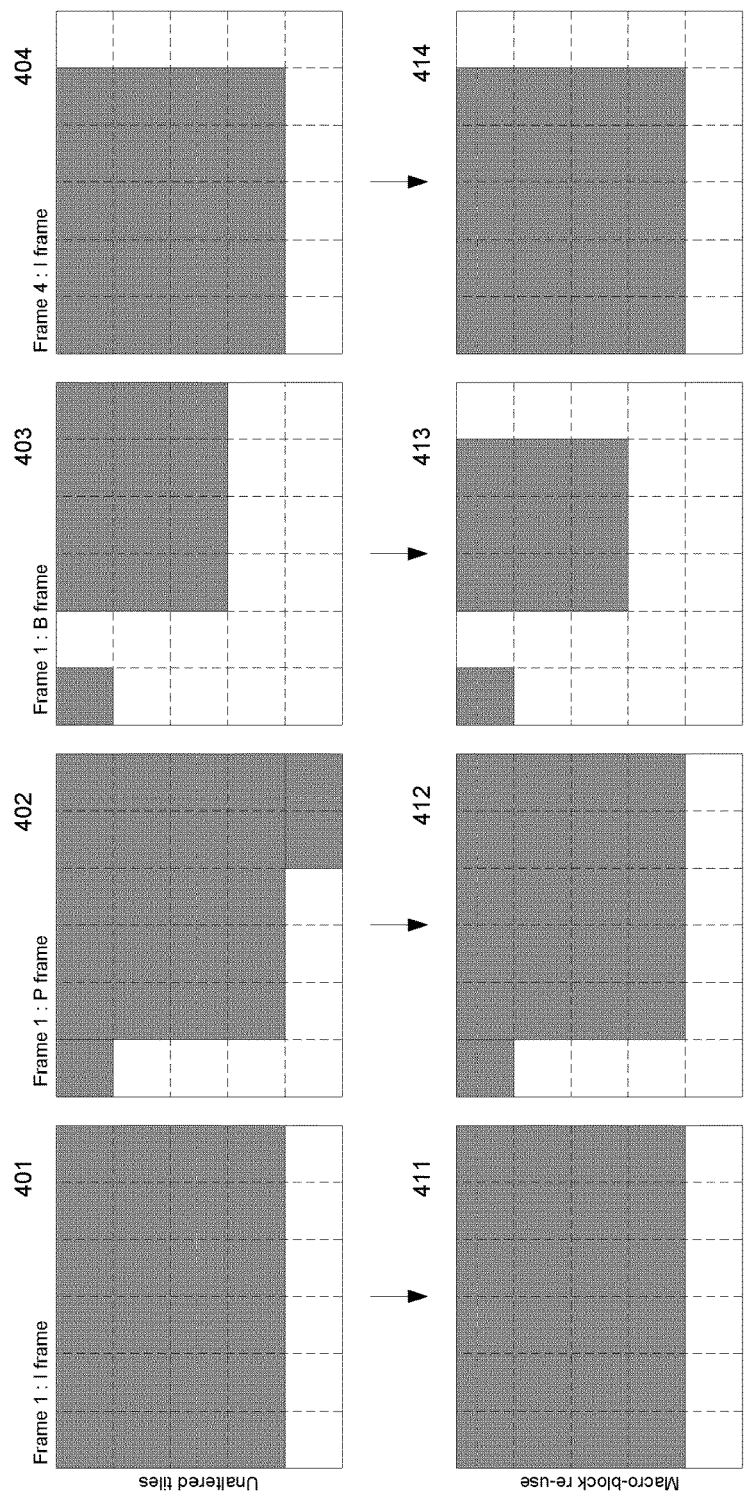
FIG. 4 is a schematic diagram illustrating an example of different video compression frame types.

An example of a decoding sequence is schematically illustrated in FIG. 4, in which, in the first row including frames 401, 402, 403 and 404, the greyed out regions in a frame represent regions that are similar between a decoded source video frame and the respective input video frame, and in the second row the greyed out regions in frames 411, 412, 413 and 414 represent regions in the frames 401, 402, 403 and 404, respectively, for which the original encoded source video content can be reused.

Since the I-frame 401 and the I-frame 404 can be independently decoded without relying on other frames, the original encoding of the source video content for all regions that are similar between a decoded source video frame and the respective input video frame may be reused, as shown by the I-frame 411 and I-frame 414.

The P-frame 402 is decoded based on a preceding decoded I-frame (which corresponds to the I-frame 401). Since the P-frame 402 was encoded based on its differences with the preceding I-frame, it requires information from the decoded I-frame to be decoded. In this case, it may not be desirable to use the encoded source video content for a region that is similar in the current P-frame but different in the preceding I-frame. Therefore, upon determining for the current P-frame that a region in the input video frame is similar to a region in the decoded source video P-frame, it is further determined whether a region in the preceding input video I-frame that corresponds to the region of the current input video P-frame is also similar to a region in the preceding decoded source video I-frame that corresponds to the region of the current decoded source video P-frame.

The greyed out regions in the P-frame 412 represent regions that are determined to be similar between the current decoded source video P-frame and the respective current input video P-frame, and further determined to also be similar between the preceding decoded source video I-frame and the respective preceding input video I-frame. In some embodiments, only the encoded source video frame regions that correspond to the greyed out regions in the P-frame 412 are reused.

The B-frame 403 is decoded based on its differences with respect to both the preceding decoded source video P-frame and the subsequent decoded source video I-frame, and so information from both the decoded source video frames is required. Similar to the case of a P-frame, it may not be desirable to use the encoding of the source video content for a region that is similar in the current B-frame but different in the preceding and/or subsequent frames. Therefore, upon determining for the current B-frame that a region in the input video B-frame is similar to a region in the decoded source video B-frame, it is further determined whether a region in the preceding input video P-frame that corresponds to the region of the current input video B-frame is also similar to a region in the preceding decoded source video P-frame that corresponds to the region of the current decoded source video B-frame, and determined whether a region in the subsequent input video I-frame that corresponds to the region of the current input video B-frame is also similar to a region in the subsequent decoded source video I-frame that corresponds to the region of the current decoded source video B-frame.

The greyed out regions in the B-frame 413 represent regions that are similar between the current decoded source video B-frame and the respective current input video B-frame, similar between the preceding decoded source P-frame and the respective preceding input video P-frame, as well as similar between the subsequent decoded source I-frame and the respective subsequent input video I-frame. In some embodiments, only the encoded source video frame regions that correspond to the greyed out regions in the B-frame 413 are reused.

Figure 8A:
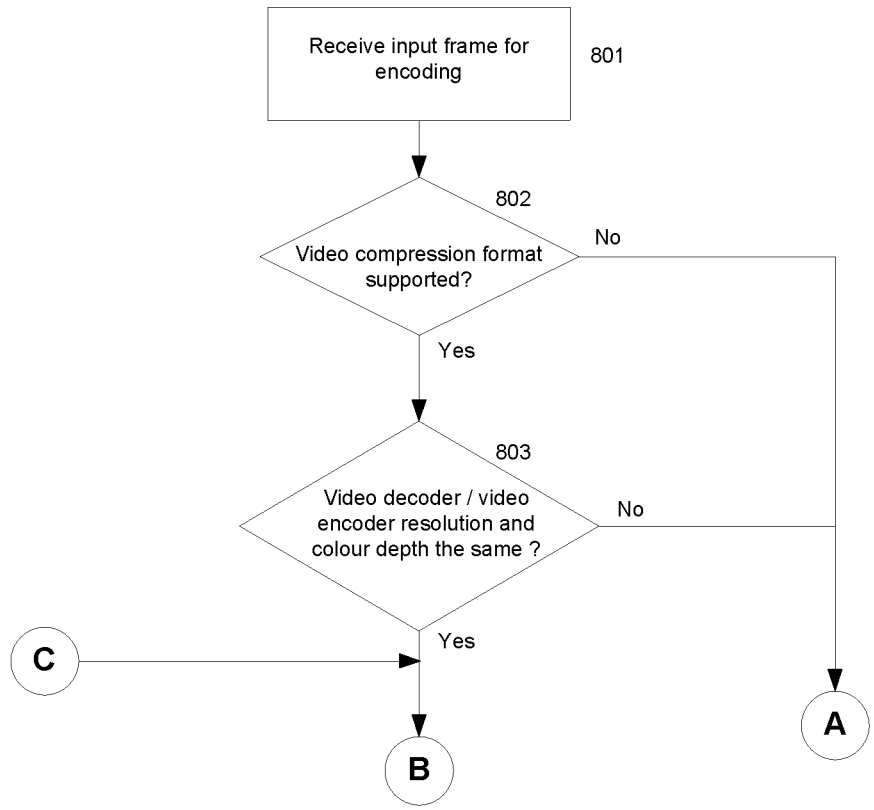
FIG. 8 is a flow diagram illustrating an exemplary method of generating an encoded video frame in an embodiment.

The above embodiment of a method of generating an encoded output video frame for transmission to an electronic display is illustrated in the flow diagram of FIG. 8. The operation begins at block 801, when a current input video frame is received by the video encoder for encoding.

At step 802, it is determined whether the video compression format, for example H.264, H.263, MPEG-4, MPEG-2, etc., of the source video content is supported by the wireless display protocol being used. If it is determined that the video compression format of the source video content is not supported, the current input video frame is encoded fully by the video encoder using a suitable encoding scheme at step 813 and the process ends at step 814.

If it is determined that the video compression format of the source video content is supported, at step 803, it is further determined whether the video decoder and the video encoder both support the same resolution and colour depth. If it is determined that the video decoder and the video encoder do not support the same resolution and the same colour depth, the current input video frame is encoded fully by the video encoder in the normal manner at step 813 and the process ends at step 814.

In some embodiments, the source video frames are grouped in the same order as the encoded output video frames. However, in some embodiments, whether the source video frames are grouped in the same order as the encoded output video frames may be additionally determined if desired. In these embodiments, the method proceeds to A if the orders are not the same, and proceeds to B if the orders are the same.

If it is determined that the video decoder and the video encoder support the same resolution and the same encoding format, it is then determined, at step 804, whether the signature(s) for a current frame region of the current input video frame is the same or sufficiently similar to the signature(s) for a corresponding frame region of the current decoded source video frame. If it is determined that the signature(s) for the current frame region is not the same or not sufficiently similar to the signature(s) for the corresponding frame region of the current decoded source video frame, the current frame region is encoded by the video encoder.

If it is determined that the signature(s) for the current frame region is the same or sufficiently similar to the signature(s) for the corresponding frame region of the current decoded source video frame, at step 805 it is determined whether the current input video frame is an I-frame. If it is determined that the current input video frame is an I-frame, the corresponding frame region of the encoded (pre-decoded) source video frame is used by the video encoder as the encoded output frame region (step 809).

If it is determined that the current input video frame is not an I-frame, at step 806, it is determined, for a preceding video frame, whether the corresponding frame region of the preceding input video frame is the same as or sufficiently similar to the corresponding frame region of the preceding decoded source video frame. If it is determined to not be the same as or sufficiently similar, at step 810, the video encoder encodes the current frame region.

If the corresponding frame region of the preceding video frame is determined to be the same as or sufficiently similar at step 806, it is determined whether the current input video frame is a P-frame at step 807. If it is determined that the current input video frame is a P-frame, at step 809 the frame region that corresponds to the current frame region in the pre-decoded source video frame is used by the video encoder as the encoded frame region.

If it is determined that the current input video frame is not a P-frame, the current input video frame is determined to be a B-frame. Then, it is further determined, at step 808, for a subsequent video frame, whether the corresponding frame region of the subsequent input video frame is the same as or sufficiently similar to the corresponding frame region of the subsequent decoded source video frame. If it is determined to not be the same as or sufficiently similar, at step 810 the video encoder encodes the current frame region.

If the corresponding frame region of the subsequent video frame is determined to be the same as or sufficiently similar at step 808, at step 809 the frame region that corresponds to the current frame region in the pre-decoded source video frame is used by the video encoder as the encoded frame region.

This then completes the processing of the current frame region.

At step 811, it is determined whether all the frame regions of the current input video frame have been processed. If all the frame regions of the current input video frame have been processed, the operation ends at step 814 (and may move on to the next frame to be processed). If not all of the frame regions have been processed, at step 812, a new frame region from the current input video frame is selected for processing by returning to step 804.

Various alternatives, modifications and additions to the above-described embodiments would be possible, if desired.

Figure 8B:
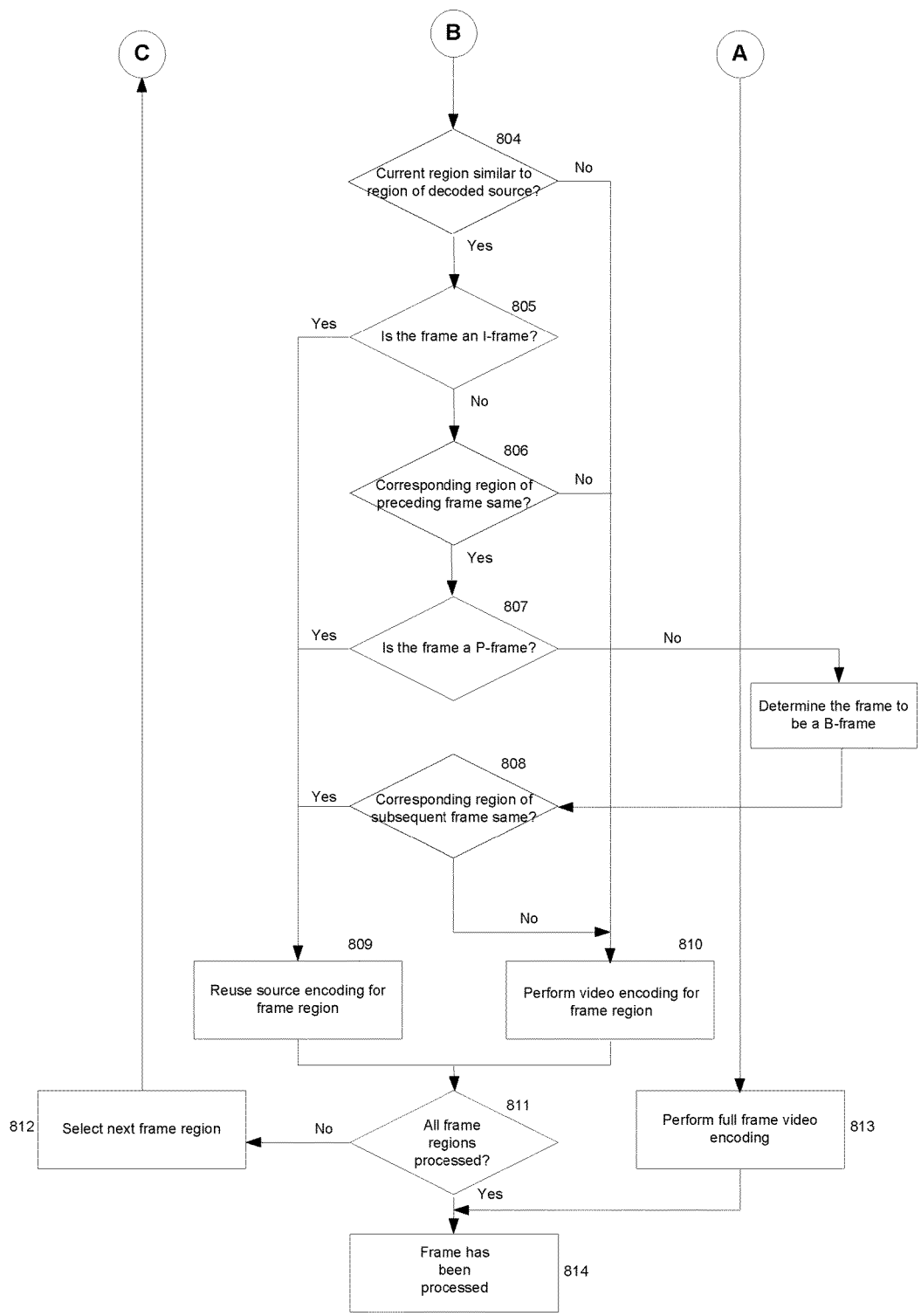

For example, with reference to FIG. 8B, at step 805, when it is determined that the current input video frame is not an I-frame, the processing may optionally proceed to step 813 so that the whole current input video frame is encoded by the video encoder if desired. Alternatively the processing may be allowed to proceed to step 806 when it is determined that the current input video frame is not an I-frame at step 805, and at step 807, after confirming that the corresponding regions of the preceding input video frame and preceding decoded source video frame are also similar, if it is determined that the current input video frame is not a P-frame, the processing may at this point optionally proceed to step 813 to encode the whole current input video frame if desired. These alternatives may be implemented in some embodiments if a simplified method is desired.

For example, even if it is determined that a particular frame region of an input video frame is not similar to a corresponding frame region of a decoded source video frame, it may still be possible to avoid encoding that input video frame region. For example, the frame region of the input video frame may be the same as or sufficiently similar to another frame region of the decoded source video frame, or to another frame region in the same or a preceding input video frame, in which case the another encoded frame region of the source video frame or the encoded frame region in the same or a preceding input video frame may be used instead of encoding the frame region in question.

Figure 7:
FIG. 7 is a schematic diagram illustrating another example of a comparison process based on frame regions.
Figure 7:
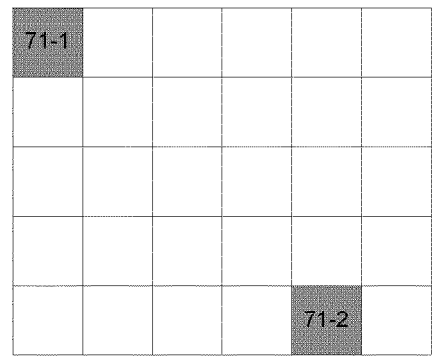

Thus, in a further embodiment, a current frame region of an input video frame is compared with one or more other frame regions of the same input video frame, as illustrated in FIG. 7. The current frame region 70-2 that is the subject of a similarity determination may be compared with one or more other frame regions of the same frame which have been previously processed (completed a similarity determination and encoded or reused source encoding). In the example, the current frame region 70-2 is determined to be the same or sufficiently similar to a frame region 70-1, in which case the video encoder can reuse the encoding of the frame region 70-1 for the current frame region 70-2.

Thus, the technology described herein is not limited to comparing the current frame region of the current input video frame with only the corresponding frame region of the current decoded source video frame (the region from which the current input video frame is obtained), but may be extended to compare the current frame region with one or more other frame regions of the current decoded source video frame, one or more frame regions of a preceding input video frame, and/or one or more already processed frame regions of the current input video frame, so as to try to find a frame region that is the same as or sufficiently similar to the current frame region. By comparing the current frame region with other available frame regions (of which the encoding may be reused in the current output video frame), it is possible to increase the likelihood of a match and thus avoid unnecessary encoding, thereby reducing processing and power consumption.

Thus, the technology described herein may be extended to perform similarity determinations between the current frame region with any other already processed frame regions available, such as frame regions of preceding decoded source video frames and preceding input video frames, as desired.

Also there need not be a one-to-one mapping between the frame regions of an input video frame and the frame regions of the decoded source video frame, of an encoded output video frame of the video encoder, etc. For example, there may be plural input frame regions that contribute, at least in part, to a given output frame region.

As will be appreciated from the above, the technology described herein, in its embodiments at least, can provide a mechanism for reducing the amount of encoding required for a video encoder to output an encoded video frame for (wireless) transmission to an electronic display compared to known, conventional video encoding techniques. It is therefore possible to reduce bandwidth and power requirements for streaming video content.

What is claimed is:

1. A method of generating an encoded output video frame for transmission to an electronic display, wherein an encoded source video frame is decoded to obtain a decoded source video frame, the decoded source video frame is processed to obtain an input video frame, and the input video frame is encoded to obtain an output video frame for transmission to an electronic display, the method comprising:
   comparing a region of an input video frame that has been obtained from a decoded source video frame with a region of the decoded source video frame to determine if the region of the decoded source video frame is similar to the region of the input video frame; and
   when it is determined that the region of the decoded source video frame is similar to the region of the input video frame, using a region of an encoded source video frame that corresponds to the region of the decoded source video frame as a region of the encoded output video frame for transmission that corresponds to the region of the input video frame.

2. The method of claim 1, wherein:
   the decoded source video frame is to be decoded based on another decoded source video frame; and
   the method further comprises:
   before using the region of the encoded source video frame as the region of the first output video frame, comparing a region of another input video frame that corresponds to the region of the input video frame, the another input video frame being obtained from the another decoded source video frame, with a region of the another decoded source video frame that corresponds to the region of the decoded source video frame to determine if the region of the another input video frame and the region of the another decoded source video frame are similar to each other; and
   only using the region of the encoded source video frame as the region of the first output video frame when it is determined that the region of the another input video frame and the region of the another decoded source video frame are similar to each other.

3. The method of claim 1 comprising, when it is determined that the region of the input video frame is not similar to a region of the decoded source video frame, and/or the region of another input video frame is not similar to the region of the corresponding another decoded source video frame, encoding the region of the input video frame for use as a region of the encoded output video frame for transmission to the electronic display that corresponds to the region of the input video frame.

4. The method of claim 1, wherein the video frame regions comprise video frame macroblocks.

5. The method of claim 1 wherein each of the source video frame, the decoded source video frame, the input video frame and the output video frame are divided into a plurality of frame regions, and the step of comparing comprises comparing each one of a plurality of frame regions of an input video frame with one or more frame regions of a decoded source video frame.

6. The method of claim 1 wherein each of the source video frame, the decoded source video frame, the input video frame and the output video frame are divided into a plurality of frame regions; and the method further comprises:
   comparing a first frame region of the input video frame with a second frame region of the input video frame having a position in the frame different from the first frame region, and when it is determined that the first frame region is similar to the second frame region, using the encoded version of the second frame region for a frame region in the encoded output video frame that corresponds to the first frame region of the input video frame.

7. The method of claim 1 wherein each of the source video frame, the decoded source video frame, the input video frame and the output video frame are divided into a plurality of frame regions; and the method further comprises:
   comparing a frame region of the input video frame with one or more frame regions of a preceding input video frame, and when it is determined that the frame region of the input video frame is similar to any one of the one or more frame regions of the preceding input video frame, using the encoded version of that frame region of the preceding input video frame for a frame region in the encoded output video frame that corresponds to the frame region of the input video frame.

8. The method of claim 1 wherein the step of comparing comprises comparing one or more signatures representative of the content of the frame region in question with one or more signatures representative of the content of the frame region that the frame region in question is to be compared with.

9. The method of claim 8, wherein each signature is representative of the content of a sub-region of the frame region in question.

10. The method of claim 1 wherein the decoded source video frame is processed by compositing the decoded source video frame with one or more other source frames.

11. The method of claim 1, further comprising:
determining whether the encoding format of the source video frame is supported by an electronic display, and when it is determined that the encoding format is not supported by the electronic display, encoding the region of the input video frame for use as a region of the encoded output video frame that corresponds to the region of the input video frame for transmission to the electronic display.

12. The method of claim 1, further comprising:
determining whether the region of the source video frame and the region of the output video frame has the same resolution and colour depth, and when it is determined that the resolution and colour depth are different, encoding the region of the input video frame for use as a region of the encoded output video frame that corresponds to the region of the input video frame for transmission to the electronic display.

13. The method of claim 1, further comprising:
determining whether the output video frame is to be ordered in respect of preceding and subsequent output video frames in the order as the source video frame, and when it is determined that the order is different, encoding the region of the input video frame for use as a region of the encoded output video frame that corresponds to the region of the input video frame for transmission to the electronic display.

14. A method of generating an encoded output video frame for transmission to an electronic display, wherein an encoded source video frame is decoded to obtain a decoded source video frame, the decoded source video frame is processed to obtain an input video frame, and the input video frame is encoded to obtain an output video frame for transmission to an electronic display, wherein at least the input video frame and the output video frame are divided into a plurality of frame regions, the method comprising:
comparing a first frame region of the input video frame with a second frame region of the input video frame having a position in the frame different from the first frame region; and
when it is determined that the first frame region is similar to the second frame region, using the encoded version of the second frame region as a frame region in the encoded output video frame that corresponds to the first frame region of the input video frame.

15. A method of generating an encoded output video frame for transmission to an electronic display, wherein an encoded source video frame is decoded to obtain a decoded source video frame, the decoded source video frame is processed to obtain an input video frame, and the input video frame is encoded to obtain an output video frame for transmission to an electronic display, wherein at least the input video frame and the output video frame are divided into a plurality of frame regions, the method comprising:
comparing a frame region of the input video frame with one or more frame regions of a preceding input video frame; and
when it is determined that the frame region of the input video frame is similar to any one of the one or more frame regions of the preceding input video frame, using the encoded version of that frame region of the preceding input video frame as a frame region in the encoded output video frame that corresponds to the frame region of the input video frame.

16. A system for generating an encoded output video frame for transmission to an electronic display, comprising:
a video decoder capable of decoding an encoded source video frame to obtain a decoded source video frame;
a processing engine capable of processing the decoded source video frame to obtain an input video frame; and
a video encoder capable of encoding the input video frame to obtain an output video frame for transmission to an electronic display; and
further comprising processing circuitry capable of, when the system is generating an encoded output video frame for transmission to an electronic display from an encoded source video frame:
comparing a region of an input video frame that has been obtained from the decoded source video frame with a region of the decoded source video frame to determine if the region of the decoded source video frame is similar to the region of the input video frame; and
when it is determined that the region of the decoded source video frame is similar to the region of the input video frame, using a region of the encoded source video frame that corresponds to the region of the decoded source video frame as a region of the encoded output video frame for transmission that corresponds to the region of the input video frame.

17. The system of claim 16, wherein:
the decoded source video frame is to be decoded based on another decoded source video frame; and
the processing circuitry is further capable of:
before using the region of the encoded source video frame as the region of the first output video frame, comparing a region of another input video frame that corresponds to the region of the input video frame, the another input video frame being obtained from the another decoded source video frame, with a region of the another decoded source video frame that corresponds to the region of the decoded source video frame to determine if the region of the another input video frame and the region of the another decoded source video frame are similar to each other; and
only using the region of the encoded source video frame as the region of the first output video frame when it is determined that the region of the another input video frame and the region of the another decoded source video frame are similar to each other.

18. The system of claim 16 wherein the processing circuitry is capable of, when it is determined that the region of the input video frame is not similar to a region of the decoded source video frame, and/or the region of another input video frame is not similar to the region of the corresponding another decoded source video frame, encoding the region of the input video frame for use as a region of the encoded output video frame for transmission to the electronic display that corresponds to the region of the input video frame.

19. The system of claim 16 wherein each of the source video frame, the decoded source video frame, the input video frame and the output video frame are divided into a plurality of frame regions; and the processing circuitry is further capable of:
comparing a first frame region of the input video frame with a second frame region of the input video frame having a position in the frame different from the first frame region, and when it is determined that the first frame region is similar to the second frame region, using the encoded version of the second frame region for a frame region in the encoded output video frame that corresponds to the first frame region of the input video frame.

20. The system of claim 16 wherein each of the source video frame, the decoded source video frame, the input video frame and the output video frame are divided into a plurality of frame regions; and the processing circuitry is further capable of:

comparing a frame region of the input video frame with one or more frame regions of a preceding input video frame, and when it is determined that the frame region of the input video frame is similar to any one of the one or more frame regions of the preceding input video frame, using the encoded version of that frame region of the preceding input video frame for a frame region in the encoded output video frame that corresponds to the frame region of the input video frame.

* * * * *